(12) United States Patent
Kyung

(10) Patent No.: US 9,418,028 B2
(45) Date of Patent: Aug. 16, 2016

(54) RESISTIVE MEMORY APPARATUS HAVING HIERARCHICAL BIT LINE STRUCTURE

(71) Applicant: SK hynix Inc., Icheon-si Gyeonggi-do (KR)

(72) Inventor: Ki Myung Kyung, Icheon-si (KR)

(73) Assignee: SK HYNIX INC., Icheon-Si (KR)

( * ) Notice: Subject to any disclaimer, the term of this patent is extended or adjusted under 35 U.S.C. 154(b) by 161 days.

(21) Appl. No.: 14/329,478

(22) Filed: Jul. 11, 2014

(65) Prior Publication Data

US 2015/0278128 A1 Oct. 1, 2015

(30) Foreign Application Priority Data

Mar. 28, 2014 (KR) .................. 10-2014-0036731

(51) Int. Cl.
*G11C 29/00* (2006.01)
*G06F 13/16* (2006.01)
*G06F 13/28* (2006.01)

(52) U.S. Cl.
CPC ............ *G06F 13/1684* (2013.01); *G06F 13/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,144,577 A * | 11/2000 | Hidaka | ................ | G11C 29/848 365/212 |
| 6,172,918 B1 * | 1/2001 | Hidaka | ................ | G11C 7/1012 365/189.05 |
| 6,662,263 B1 * | 12/2003 | Wong | .................. | G06F 12/0246 365/185.11 |
| 2004/0136228 A1 * | 7/2004 | Campardo | ........... | G11C 11/005 365/150 |
| 2011/0242872 A1 | 10/2011 | Hanzawa | | |
| 2013/0223170 A1 * | 8/2013 | Kajigaya | ................ | G11C 29/04 365/200 |

* cited by examiner

*Primary Examiner* — Guerrier Merant
(74) *Attorney, Agent, or Firm* — William Park & Associates Ltd.

(57) ABSTRACT

A resistive memory apparatus includes a plurality of bit lines, a plurality of local bit lines, and a plurality of global bit lines. The plurality of bit lines is electrically coupled to a plurality of memory cells. The plurality of local bit lines are extended in a row direction, and electrically coupled to one or more of the plurality of bit lines. The plurality of global bit lines are extended in the column direction, and electrically coupled to one or more of the plurality of local bit lines.

14 Claims, 7 Drawing Sheets

RESISTIVE MEMORY APPARATUS HAVING HIERARCHICAL BIT LINE STRUCTURE

CROSS-REFERENCES TO RELATED APPLICATION

The present application claims priority under 35 U.S.C. §119(a) to Korean application number 10-2014-0036731, filed on Mar. 28, 2014 in the Korean Intellectual Property Office, which is incorporated herein by reference in its entirety as set forth in full.

BACKGROUND

1. Technical Field

Various embodiments generally relate to a resistive memory apparatus, and more particularly, to a resistive memory apparatus having a hierarchical bit line structure.

2. Related Art

A semiconductor memory apparatus is an electronic apparatus for storing and outputting data by performing data communication with a controller or a host, and a dynamic random memory (DRAM) having a capacitor as a data storage device is a general semiconductor memory apparatus. The DRAM has a drawback of losing stored data because of a leakage current in the capacitor when a power supply to the DRAM is cut off. To remedy the drawback of the DRAM, there is provided a flash memory apparatus capable of retaining data using a floating gate even though a power supply to the flash memory apparatus is cut off. However, the flash memory apparatus has weakness that speed of data storage and data output is slow and the flash memory apparatus does not support random access.

To make up the demerits of the DRAM and flash memory apparatus, there are provided next-generation memory apparatuses, which are non-volatile and have fast speed of data storage and data output. Examples of the next-generation memory apparatuses are Phase Change Random Access Memory (PCRAM), Resistive Random Access Memory (ReRAM), Magnetic Random Access Memory (MRAM), to Ferromagnetic Random Access Memory (FeRAM), and Spin Torque Transfer Memory (STTRAM). The next-generation memory apparatuses have memory cells capable of retaining data even though a power supply to the memory apparatuses is cut off.

SUMMARY

In an embodiment of the invention, a resistive memory apparatus may include a memory block including a plurality of memory cells. The resistive memory apparatus may also include a plurality of bit lines electrically coupled to the plurality of memory cells, and extended in a column direction. In addition, the resistive memory apparatus may also include a plurality of local bit lines extended in a row direction, and electrically coupled to one or more of the plurality of bit lines. Further, the resistive memory apparatus may also include a plurality of global bit lines extended in the column direction, and electrically coupled to one or more of the plurality of local bit lines. The resistive memory apparatus may also include a data input/output circuit suitable for transmitting data to the plurality of global bit lines, or receiving data transmitted through the plurality of global bit lines.

In an embodiment of the invention, a resistive memory apparatus may include a memory block including a plurality of memory cells. The resistive memory apparatus may include a plurality of bit lines electrically coupled to the plurality of memory cells, and extended in a column direction. Further, the resistive to memory apparatus may include a plurality of local bit lines extended in a row direction. In addition, the resistive memory apparatus may include a decoding switching part suitable for electrically coupling one or more of the plurality of bit lines to the plurality of local bit lines according to a local selection signal and a global selection signal.

In an embodiment of the invention, a resistive memory apparatus may include a plurality of bit lines electrically coupled to one or more memory cells and configured to be extended in a column direction. The resistive memory apparatus may also include a plurality of local bit lines electrically coupled to one or more of the plurality of bit lines and configured to be extended in a row direction. In addition, the resistive memory apparatus may include a plurality of global bit lines electrically coupled to one or more of the plurality of local bit lines and configured to be extended in the column direction. Further, the resistive memory apparatus may include a data input/output circuit configured to transmit and receive data to and from the plurality of global bit lines.

DETAILED DESCRIPTION

Hereinafter, a semiconductor apparatuses will be described below with reference to the accompanying figures through various examples of embodiments. A resistive memory apparatus may have the following shortcomings. There are a great number of the global bit lines because a number of the bit lines which can be electrically coupled to each of the plurality of global bit lines are restricted. Also, the write circuit and the read circuit have a plurality of unit circuits, each of which is electrically coupled to each of the plurality of global bit lines, and accordingly a size of the data input/output circuit increases as the number of the global bit lines increases. Further, recently a multi-level cell for storing two or more bits may be provided, and a resistive memory apparatus using the multi-level cell may have a great number of global bit lines incurring undesired to increase of inner elements Referring to FIG. 1, the resistive memory apparatus 1 may include a memory block 110, a plurality of bit lines BL0 to BL7 and BL30 to BL31, a plurality of local bit lines LBL0 to LBL7, a plurality of global bit lines GBL0 to GBL3, and a data input/output circuit 120. The memory block 110 may include a plurality of memory cells. The plurality of memory cells may be electrically coupled to the plurality of bit lines BL0 to BL7 and BL30 to BL31. The plurality of bit lines BL0 to BL7 and BL30 to BL31 may extend in a column direction. The plurality of bit lines BL0 to BL7 and BL30 to BL31 may be disposed on the memory block 110. Although not illustrated, a plurality of word lines may be disposed on the memory block 110. In addition, a memory cell may be defined on cross point of the plurality of word lines and the plurality of bit lines BL0 to BL7 and BL30 to BL31. The memory block 110 may include a memory array and a repair array. The repair array may include a repair memory cell to replace a failed memory cell when a memory cell in the memory array is failed.

Figure 1:
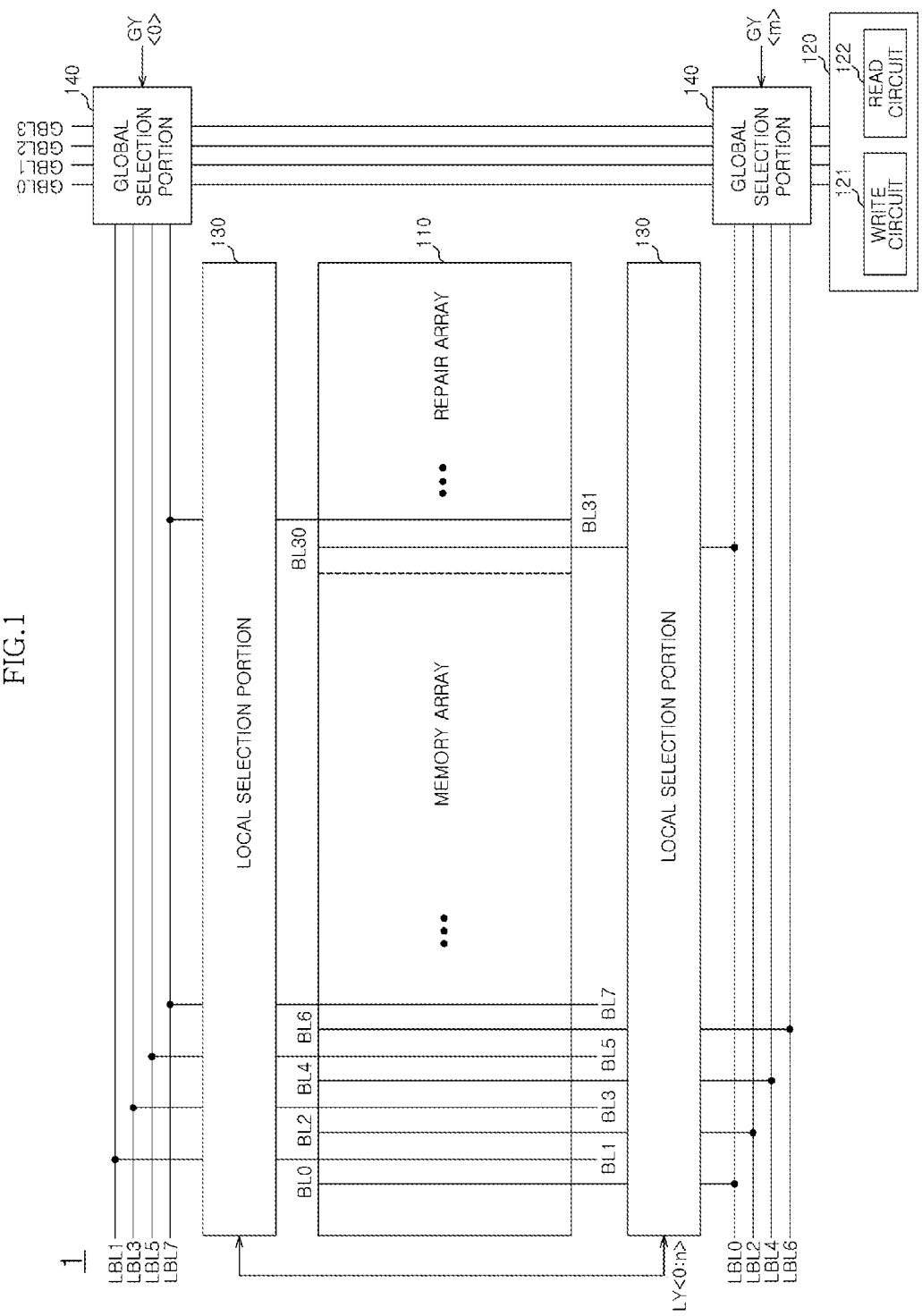
FIG. 1 is a schematic diagram illustrating a representation of a resistive memory apparatus in accordance with an embodiment.

The plurality of local bit lines LBL0 to LBL7 may extend in a row direction. Each of the plurality of local bit lines LBL0 to LBL7 may be electrically coupled to one or more of the plurality of bit lines BL0 to BL7 and BL30 to BL31. For example, when one local bit line is electrically coupled to four number of the bit lines, a number of the local bit lines may be quarter of a number of the bit lines. The plurality of local bit lines LBL0 to LBL7 may extend in the row direction perpendicular to the extended direction of the plurality of bit lines BL0 to BL7 and BL30 to BL31. The plurality of local bit lines LBL0 to LBL7 may be disposed over and/or under the memory block 110 in the column direction. When the plurality of local bit lines LBL0 to LBL7 are disposed over and under the memory block 110, as illustrated in FIG. 1, either one of even local bit lines LBL0, LBL2, LBL4 and LBL6 and odd local bit lines LBL1, LBL3, LBL5 and LBL7 may be disposed over the memory block 110. Further, the other one of even local bit lines LBL0, LBL2, LBL4 and LBL6 and odd local bit lines LBL1, LBL3, LBL5 and LBL7 may be disposed under the memory block 110.

The plurality of global bit lines GBL0 to GBL3 may extend in the column direction. Each of the plurality of global bit lines GBL0 to GBL3 may be electrically coupled to the plurality of local bit lines LBL0 to LBL7. The plurality of global bit lines GBL0 to GBL3 may be electrically coupled to the data input/output circuit 120. The plurality of global bit lines GBL0 to GBL3 may be disposed on the memory block 110. As an embodiment of the invention, the plurality of global bit lines GBL0 to GBL3 may be disposed outside of the memory block 110.

The data input/output circuit 120 may be electrically coupled to the plurality of global bit lines GBL0 to GBL3. The data input/output circuit 120 may be configured to transmit data to the plurality of global bit lines GBL0 to GBL3. The data input/output circuit 120 may be configured to receive data outputted through the plurality of global bit lines GBL0 to GBL3. The data input/output to circuit 120 during a write operation may transmit data to be stored in the memory cell to the plurality of global bit lines GBL0 to GBL3. In addition, the data input/output circuit 120 during a read operation may receive data outputted from the memory cell through the plurality of global bit lines GBL0 to GBL3. The data input/output circuit 120 may include a write circuit 121 which transmits data to the plurality of global bit lines GBL0 to GBL3 during the write operation. The data input/output circuit 120 may also include a read circuit 122 which receives data transmitted through the plurality of global bit lines GBL0 to GBL3 during the read operation. Although not illustrated, each of the write circuit 121 and the read circuit 122 may include a plurality of unit circuits. The plurality of unit circuits may be provided as many as the plurality of global bit lines GBL0 to GBL3.

As illustrated in FIG. 1, the resistive memory apparatus 1 may further configured to include a local selection portion 130 and a global selection portion 140. The local selection portion 130 may electrically couple one or more of the plurality of bit lines BL0 to BL7 and BL30 to BL31 to the plurality of local bit lines LBL0 to LBL7, respectively, in response to a local selection signal LY<0:n>. The local selection signal LY<0:n> may be generated on the basis of a column address signal that the resistive memory apparatus 1 receives from an external controller. The local selection signal LY<0:n> may be generated by a column address decoding circuit. The local selection signal LY<0:n> may be provided to the local selection portion 130 through a signal line that extends in the column direction. The global selection portion 140 may electrically couple one or more of the plurality of local bit lines LBL0 to LBL7 to the plurality of global bit lines GBL0 to GBL3 in response to a global selection signal GY<0:m>. The global selection signal GY<0:m> may be generated according to a row address signal that the resistive memory apparatus 1 receives from an external controller. The global selection signal GY<0:m> may be generated by a row address decoding circuit. The global selection signal GY<0:m> may be provided to the global selection portion 140 through a signal line extending in the row direction.

During the writing operation, the write circuit 121 may be configured to provide a voltage or a current corresponding to data to be stored in the memory cell to the plurality of global bit lines GBL0 to GBL3. The global selection portion 140 may electrically couple the plurality of local bit lines LBL0 to LBL7, which are electrically coupled to the memory cell to store the data, to the plurality of global bit lines GBL0 to GBL3 according to the global selection signal GY<0:m>. The local selection portion 130 may electrically couple the plurality of local bit lines LBL0 to LBL7, which are electrically coupled to the memory cell to store the data, to the plurality of bit lines BL0 to BL7 and BL30 to BL31 according to the local selection signal LY<0:n>. Therefore, the voltage or the current inputted to the plurality of global bit lines GBL0 to GBL3 may be transferred to the memory cell through the plurality of local bit lines LBL0 to LBL7 or the plurality of bit lines BL0 to BL7 and BL30 to BL31. Further, the memory cell would store the data corresponding to the transferred voltage or current. During the read operation, data outputted from the memory cell may be transferred sequentially through the plurality of bit lines BL0 to BL7 and BL30 to BL31, the plurality of local bit lines LBL0 to LBL7, and the plurality of global bit lines GBL0 to GBL3. In addition, the read circuit 122 may sense data outputted through the plurality of global bit lines GBL0 to GBL3.

The resistive memory apparatus 1 may have the hierarchical bit line structure including the plurality of bit lines BL0 to BL7 and BL30 to BL31, the plurality of local bit lines LBL0 to LBL7, and the plurality of global bit lines GBL0 to GBL3. As a result, the resistive memory apparatus 1 may have a minimized number of the global bit lines GBL0 to GBL3. Therefore, the size of the data input/output circuit 120 electrically coupled to the plurality of global bit lines GBL0 to GBL3 may be minimized. In addition, the plurality of bit lines BL0 to BL7 electrically coupled to the memory cell of the memory array, and the plurality of bit lines BL30 to BL31 electrically coupled to the memory cell of the repair array may be electrically coupled to the plurality of local bit lines LBL0 to LBL7 in common through the local selection portion 130. Similar to the plurality of bit lines BL0 to BL7 electrically coupled to the memory cell of the memory array, the plurality of bit lines BL30 to BL31 electrically coupled to the memory cell of the repair array may be accessed through the plurality of local bit lines LBL0 to LBL7 and the plurality of global bit lines GBL0 to GBL3. Accordingly, the resistive memory apparatus 1 may not need an additional data input/ output circuit to store data into the memory cell of the repair array or to output data from the memory cell.

Figure 2:
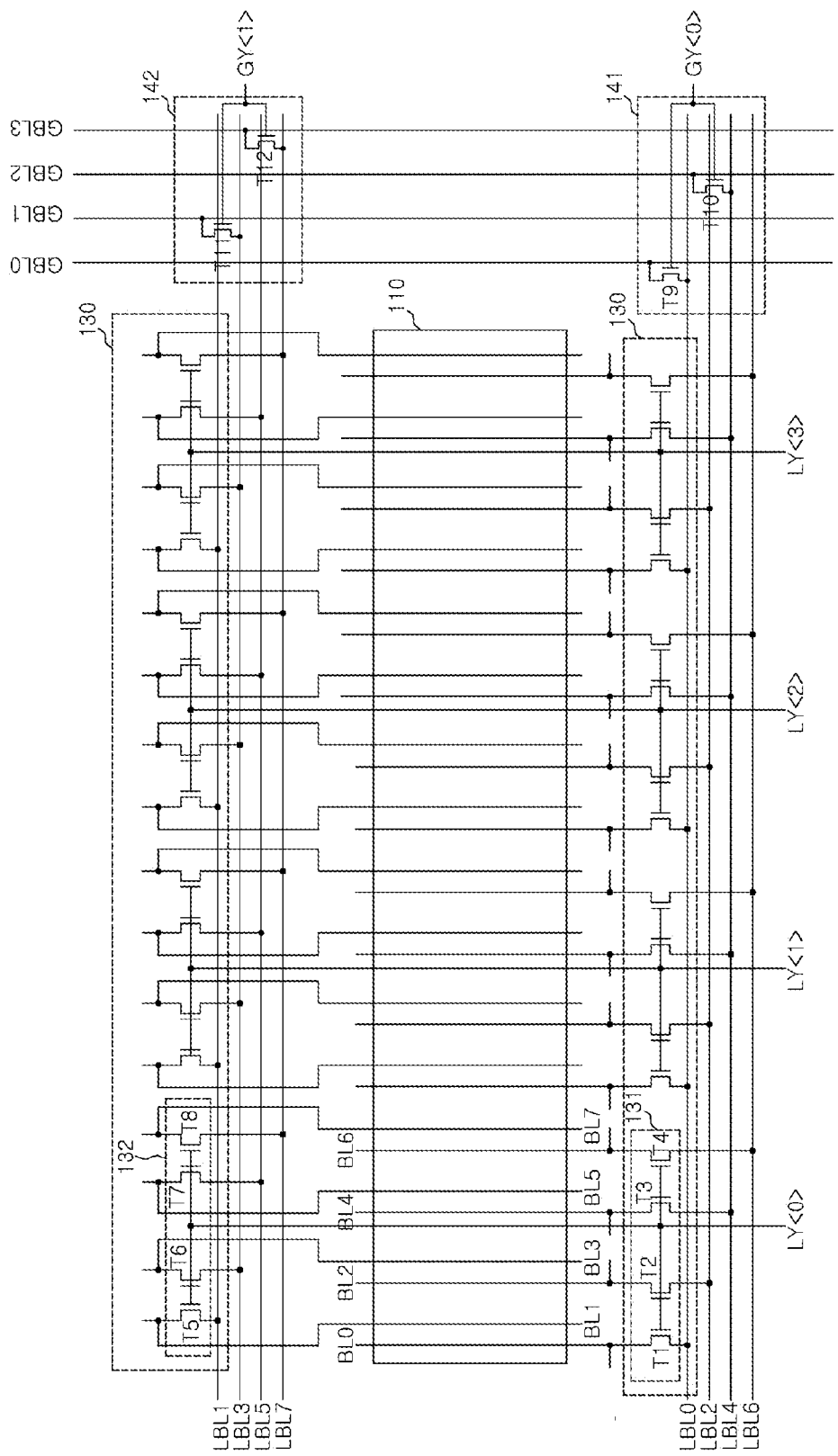
FIG. 2 is a detailed diagram illustrating a representation of a resistive memory apparatus shown in FIG. 1.
Figure 3:
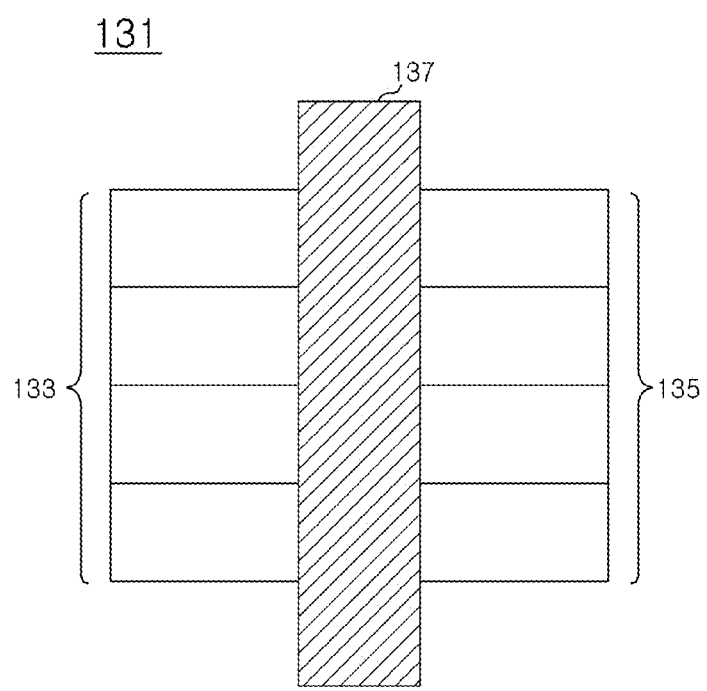
FIG. 3 is a schematic diagram illustrating a representation of a first local switch shown in FIG. 2.

Referring to FIG. 2, a detailed diagram illustrating the resistive memory apparatus 1 shown in FIG. 1 is shown. In FIG. 3, the plurality of bit lines BL0 to BL7 extended in the column direction may be disposed on the memory block 110. The plurality of local bit lines LBL0 to LBL7 extended in the row direction, may be disposed over and/or under the memory block 110 in the column direction. The plurality of global bit lines GBL0 to GBL3 extended in the column direction, may be disposed on right side of the memory block 110. First to fourth local selection signal LY<0:3> may be provided to the local selection portion 130 through the signal line extending in the column direction. First and second global selection signal GY<0:1> may be provided to the global selection portion 140 through the signal line extending in the row direction.

The local selection portion 130 may include a plurality of local switches. A first local switch 131 may include four numbers of transistors T1 to T4. In addition, drains of the transistors T1 to T4 may be electrically coupled to a first local bit line LBL0, a third local bit line LBL2, a fifth local bit line LBL4, and a seventh local bit line LBL6, respectively. The transistors T1 to T4 may receive the first local selection signal LY<0> at gates thereof. Sources of the transistors T1 to T4 may be electrically coupled to a first bit line BL0, a third bit line BL2, a fifth bit line BL4, and a seventh bit line BL6, respectively. The sources of the transistors T1 to T4 may be electrically coupled to bit to lines of another memory block disposed under the memory block 110. Accordingly, when the first local switch 131 is selected by the first local selection signal LY<0>, the first local switch 131 may electrically couple the first bit line BL0 to the first local bit line LBL0, the third bit line BL2 to the third local bit line LBL2, the fifth bit line BL4 to the fifth local bit line LBL4, and the seventh bit line BL6 to the seventh local bit line LBL6. Similarly to the first local switch 131, a second local switch 132 may include four numbers of transistors T5 to T8. In addition, drains of the transistors T5 to T8 may be electrically coupled to a second local bit line LBL1, a fourth local bit line LBL3, a sixth local bit line LBL5, and a eighth local bit line LBL7, respectively. The transistors T5 to T8 may receive the first local selection signal LY<0> at gates thereof. Sources of the transistors T5 to T8 may be electrically coupled to a second bit line BL1, a fourth bit line BL3, a sixth bit line BL5, and an eighth bit line BL7, respectively. The sources of the transistors T5 to T8 may be electrically coupled to bit lines of another memory block disposed over the memory block 110. Accordingly, when the second local switch 132 is selected by the first local selection signal LY<0>, the second local switch 132 may electrically couple the second bit line BL1 to the second local bit line LBL1, the fourth bit line BL3 to the fourth local bit line LBL3, the sixth bit line BL5 to the sixth local bit line LBL5, and the eighth bit line BL7 to the eighth local bit line LBL7. With an embodiment as described above, the plurality of bit lines BL0 to BL7 disposed on the memory block 110 may be electrically coupled to the plurality of local bit lines LBL0 to LBL7 through the local selection signal LY<0:3> and the plurality of local switches 131 and 132.

The global selection portion 140 may include a plurality of global switches. A first global switch 141 may include two numbers of transistors T9 and T10. Further, drains of the transistors T9 and T10 may be electrically coupled to the first local bit line LBL0, and the fifth local bit line LBL4, respectively. The transistors T9 and T10 may receive the first global selection signal GY<0> at gates thereof. Sources of the transistors T9 and T10 may be electrically coupled to a first global bit line GBL0, and a third global bit line GBL2, respectively. Accordingly, when the first global switch 141 is selected by the first global selection signal GY<0>, the first global switch 141 may electrically couple the first global bit line GBL0 to the first local bit line LBL0, and the third global bit line GBL2 to the third local bit line LBL2. Similarly to the first global switch 141, a second global switch 142 may include two numbers of transistors T11 and T12. In addition, drains of the transistors T11 and T12 may be electrically coupled to the fourth local bit line LBL3, and the eighth local bit line LBL7, respectively. The transistors T11 to T12 may receive the second global selection signal GY<1> at gates thereof. Sources of the transistors T11 and T12 may be electrically coupled to a second global bit line GBL1, and a fourth global bit line GBL3, respectively. Accordingly, the second global local switch 142 may electrically couple the second global bit line GBL1 to the fourth local bit line LBL3, and the fourth global bit line GBL3 to the eighth local bit line LBL7 in to response to the second global selection signal GY<1>. Another global bit lines extending in column direction may be disposed at left side of the memory block 110. In addition, the another global bit lines may be electrically coupled to the second local bit line LBL1, the third local bit line LBL2, the sixth local bit line LBL5, and the seventh local bit line LBL6, respectively, by additional global switch and additional global selection signal.

Referring to FIG. 3, a schematic diagram illustrating the first local switch 131 shown in FIG. 2 is illustrated. The first local switch 131 may include a first junction region 133, a second junction region 135, and a gate 137. The transistors T1 to T4 comprising the first local switch 131 may be electrically coupled to correspondingly assigned bit lines and local bit lines at drains and sources thereof. Further, the transistors T1 to T4 may commonly receive the first local selection signal LY<0> at gates thereof. Therefore, the gate 137 may be commonly stacked on the first and second junction regions 133 and 135 to minimize the area for the transistors T1 to T4 comprising the first local switch 131. Accordingly, the size of the local selection portion 130 may be minimized using the structure of the first local switch 131 shown in FIG. 3.

Figure 4:
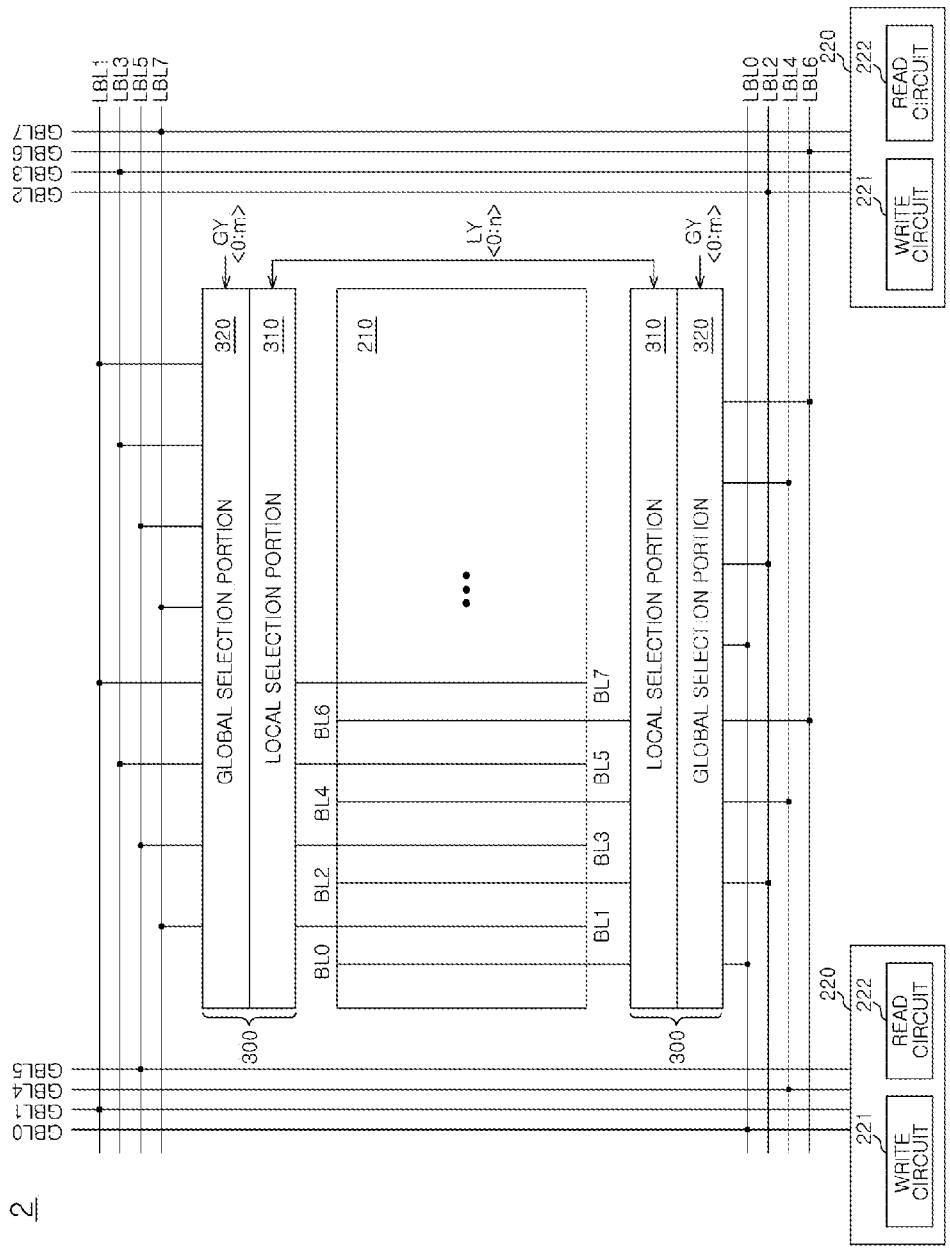
FIG. 4 is a schematic diagram illustrating a representation of a resistive memory apparatus in accordance with an embodiment.

Referring to FIG. 4, a schematic diagram illustrating a resistive memory apparatus 2 in accordance with an embodiment of the invention is shown. Referring to FIG. 4, the resistive memory apparatus 2 may include a memory block 210, a plurality of bit lines BL0 to BL7, a plurality of local bit lines LBL0 to LBL7, a plurality of global bit lines GBL0 to GBL7, and a decoding switching part 300. The memory block 210 may include a plurality of memory cells. The plurality of memory cells of the memory block 210 may be electrically coupled to the plurality of bit lines BL0 to BL7 and BL30 to BL31. The plurality of bit lines BL0 to BL7 may be extended in the column direction. The plurality of local bit lines LBL0 to LBL7 may be extended in the row direction, and disposed over and under the memory block 210. The plurality of local bit lines LBL0 to LBL7 may be electrically coupled to one or more of the plurality of bit lines BL0 to BL7 through the decoding switching part 300. The plurality of global bit lines GBL0 to GBL7 may be disposed aside from the memory block 210, and may be extended in the column direction. The plurality of global bit lines GBL0 to GBL7 may be electrically coupled to the plurality of local bit lines LBL0 to LBL7, respectively. In the resistive memory apparatus 2, the plurality of local bit lines LBL0 to LBL7 and the plurality of global bit lines GBL0 to GBL7 may perform the same function as each other.

The decoding switching part 300 may electrically couple one or more of the plurality of bit lines BL0 to BL7 to the plurality of local bit lines LBL0 to LBL7 according to the local selection signal LY<0:n> and the global selection signal GY<0:m>. The decoding switching part 300 may include a local selection portion 310 and a global selection portion 320. The local selection portion 310 may electrically select one or more of the plurality of bit lines BL0 to BL7 in response to the local selection signal LY<0:n>. The global selection portion 320 may electrically couple the local selection portion 310 to the plurality of local bit lines LBL0 to LBL7 in response to the global selection signal GY<0:m>. Accordingly, the decoding switching part 300 may hierarchically select bit lines to be electrically coupled to the plurality of local bit lines LBL0 to LBL7 according to the local selection signal LY<0:n> and the global selection signal GY<0:m>. For example, the local selection portion 310 may select four numbers of the bit lines according to one number of the local selection signal, and a total of sixteen numbers of the bit lines according to four numbers of the local selection signals. The global selection portion 320 may electrically couple the four of the sixteen number of the bit lines, which are selected by the local selection portion 310, to four number of the local bit lines, respectively, in response to one number of the global selection signal. The decoding switching part 300 may select ones of the plurality of bit lines BL0 to BL7 to be electrically coupled to the plurality of local bit lines LBL0 to LBL7 in two stages. As a result, the decoding switching part 300 may electrically couple a great number of the bit lines BL0 to BL7 disposed at the memory block 210 to the limited number of the local bit lines LBL0 to LBL7 and the global bit lines GBL0 to GBL7, and the number of the global bit lines GBL0 to GBL7 may then be reduced. The decoding switching part 300 may be disposed over and under the memory block 210. The decoding switching part 300 disposed under the memory block 210 may be electrically coupled to even bit lines BL0, BL2, BL4, and BL6 of the memory block 210. In addition, the decoding switching part 300 disposed over the memory block 210 may be electrically coupled to odd bit lines BL1, BL3, BL5, and BL7 of the memory block 210.

The plurality of global bit lines GBL0 to GBL7 may be electrically coupled to a data input/output circuit 220. The data input/output circuit 220 during the write operation may transmit data to be stored in the memory cell to the plurality of global bit lines GBL0 to GBL7. In addition, the data input/output circuit 220 during the read operation may sense data outputted from the memory cell through the plurality of global bit lines GBL0 to GBL7. The data input/output circuit 220 may include a write circuit 221 and a read circuit 222. Similarly to the memory block 110 described with reference to FIG. 1, the memory block 210 may include a memory array and a repair array. The plurality of bit lines BL0 to BL7 electrically coupled to the memory cell of the memory array, and electrically coupled to the memory cell of the repair array may be electrically coupled to the plurality of local bit lines LBL0 to LBL7 and the plurality of global bit lines GBL0 to GBL7 through the decoding switching part 300, and thus may be accessed commonly through the data input/output circuit 220.

Figure 5:
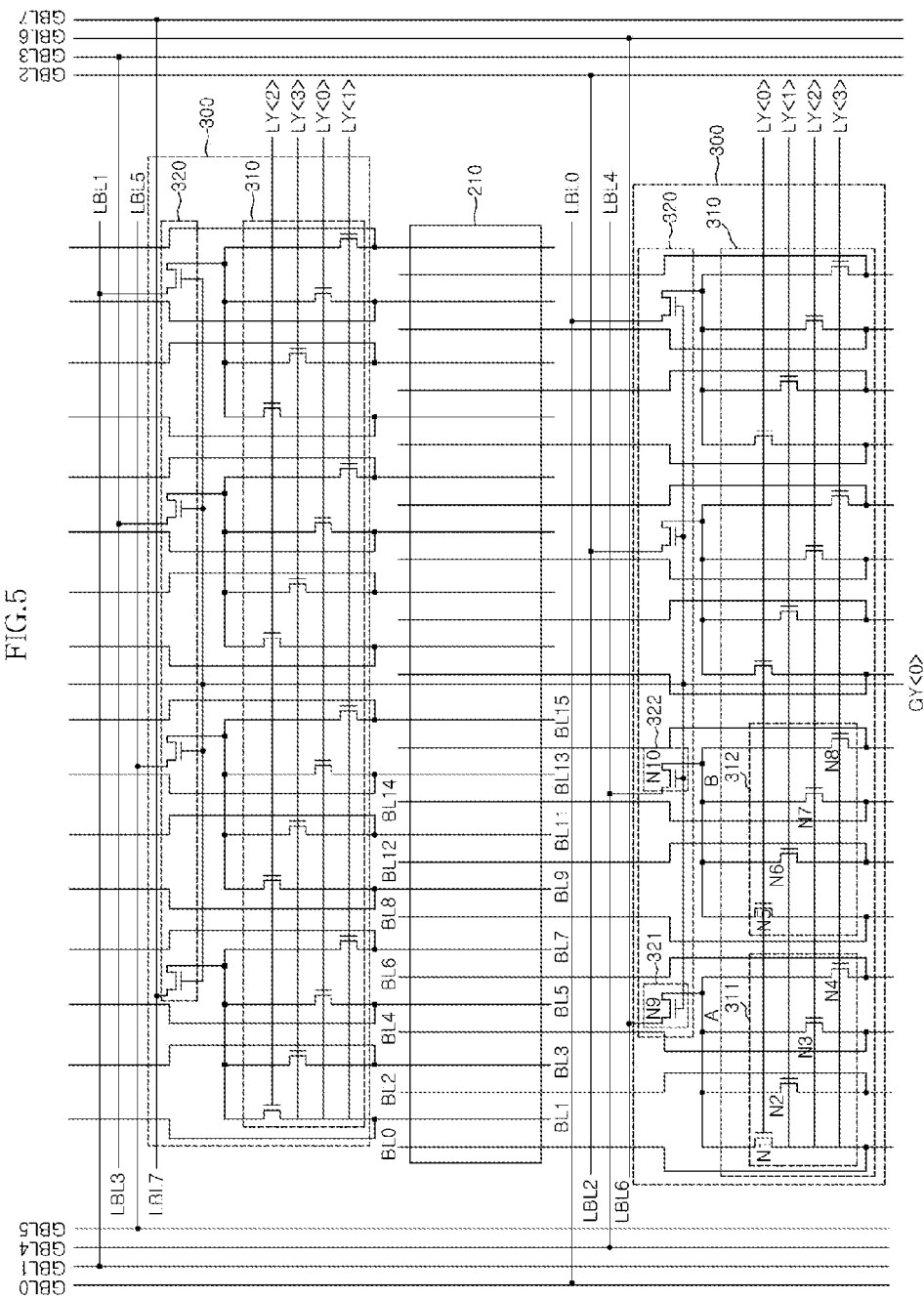
FIG. 5 is a detailed diagram illustrating a representation of a resistive memory apparatus shown in FIG. 4.

Referring to FIG. 5, a detailed diagram illustrating the resistive memory apparatus 2 shown in FIG. 4 is shown. The plurality of bit lines BL0 to BL15 extended in the column direction, may be disposed on the memory block 210. The plurality of local bit lines LBL0 to LBL7 extended in the row direction, may be disposed over and under the memory block 210 in the column direction. The plurality of global bit lines GBL0 to GBL7 may be disposed aside from the memory block 210. The plurality of global bit lines GBL0 to GBL7 extended in the column direction, may be disposed on left and right side of the memory block 210 in the row direction. The first to eighth local bit lines LBL0 to LBL7 may be electrically coupled to the first to eighth global bit lines GBL0 to GBL7, respectively. The first to eighth local bit lines LBL0 to LBL7 and the first to eighth global bit lines GBL0 to GBL7 may be electrically coupled to each other on one-to-one basis, and may perform the same function as each other. The first to eighth local bit lines LBL0 to LBL7 and the first to eighth global bit lines GBL0 to GBL7 may be electrically coupled to the plurality of bit lines BL0 to BL15 through the decoding switching part 300.

The decoding switching part 300 may be disposed over and under the memory block 210. The decoding switching part 300 may include the local selection portion 310 and the global selection portion 320. The decoding switching part 300 disposed under the memory block 210 may be electrically coupled commonly to even bit lines BL0, BL2, BL4, BL6, BL8, BL10, BL12, and BL14 of the memory block 210, and even bit lines of another memory bank that may be disposed under the memory block 210. The decoding switching part 300 disposed over the memory block 210 may be electrically coupled commonly to odd bit lines BL1, BL3, BL5, BL7, BL9, BL11, BL13, and BL15 of the memory block 210, and odd bit lines of another memory bank that may be disposed over the memory block 210.

The local selection portion 310 may include a plurality of local switches. A first local switch 311 may include first to fourth transistors N1 to N4. The first transistor N1 may receive the first local selection signal LY<0> at its gate. The first transistor N1 may be electrically coupled to the first bit line BL0 at its source and may be electrically coupled to a first output node A at its drain. The second transistor N2 may receive the second local selection signal LY<1> at its gate. The second transistor N2 may be electrically coupled to the third bit line BL2 at its source, and may be electrically coupled to the first output node A at its drain. The third transistor N3 may receive the third local selection signal LY<2> at its gate. The third transistor N3 may be electrically coupled to the fifth bit line BL4 at its source, and may be electrically coupled to the first output node A at its drain. The fourth transistor N4 may receive the fourth local selection signal LY<3> at its gate. The fourth transistor N4 may be electrically coupled to the seventh bit line BL6 at its source, and may be electrically coupled to the first output node A at its drain. The sources of the first to fourth transistors N1 to N4 may be electrically coupled to the bit lines of another memory block, which may be disposed under the memory block 210, respectively.

A second local switch 312 may include fifth to eighth transistors N5 to N8. The fifth transistor N5 may receive the first local selection signal LY<0> at its gate. The fifth transistor N5 may be electrically coupled to the ninth bit line BL8 at its source, and may be electrically coupled to a second output node B at its drain. The sixth to transistor N6 may receive the second local selection signal LY<1> at its gate. The sixth transistor N6 may be electrically coupled to the eleventh bit line BL10 at its source, and may be electrically coupled to the second output node B at its drain. The seventh transistor N7 may receive the third local selection signal LY<2> at its gate. The seventh transistor N7 may be electrically coupled to the thirteenth bit line BL12 at its source, and may be electrically coupled to the second output node B at its drain. The eighth transistor N8 may receive the fourth local selection signal LY<3> at its gate. The eighth transistor N8 may be electrically coupled to the fifteenth bit line BL14 at its source, and may be electrically coupled to the second output node B at its drain. The sources of the fifth to eighth transistors N5 to N8 may be electrically coupled to the bit lines of another memory block, which may be disposed under the memory block 210, respectively. As described above, each of the plurality of local switches 311 and 312 of the local selection portion 310 may couple four numbers of the bit lines to one number of the output node in response to the local selection signal LY<0:n>.

The global selection portion 320 may include a plurality of global switches. A first global switch 321 may include a ninth transistor N9. The ninth transistor N9 may receive the first global selection signal GY<0> at its gate. The ninth transistor N9 may be electrically coupled to the first output node A at its source, and may be electrically coupled to the seventh local bit line LBL6 at its drain. A second global switch 322 may include a tenth transistor N10. The tenth transistor N10 may receive the first global selection signal GY<0> at its gate. The tenth transistor N10 may be electrically coupled to the second output node B at its source, and may be electrically coupled to the fifth local bit line LBL4 at its drain. As illustrated in FIG. 5, each of the global switches included in the global selection portion 320 may be electrically coupled to four numbers of local switches included in the local selection portion 310. In addition, each of the local switches included in the local selection portion 310 may be electrically coupled to four numbers of the bit lines. Therefore, one of the sixteen numbers of the bit lines may be electrically coupled to one number of the local bit line and global bit line through the decoding switching part 300. FIG. 5 illustrates four numbers of the bit lines selected by one number of the local switch, and four numbers of the local switches selected by one number of the global switch, which will not limit the scope of the invention. The number of the bit lines electrically coupled to one number of the local switch and the number of the local switches electrically coupled to one number of the global switch may be modified and changed with ease.

As an embodiment, input sequence of the local selection signal LY<0:n> to the local switch of the local selection portion 310 disposed over the memory block 210 may be different from input sequence of the local selection signal LY<0:n> to the first and second local switches 311 and 312. As illustrated in FIG. 5, the first and second local switches 311 and 312 may receive the first to fourth local selection signal LY<0:3> in order. In addition, the local switch disposed over the memory block 210 may receive the third local selection signal LY<2>, the fourth local selection signal LY<3>, the first local selection signal LY<0>, and the second local selection signal LY<1> in order. In this instance, by allowing the input is sequence of the local selection signal LY<0:3> to the local switch disposed over the memory block 210 and the input sequence of the local selection signal LY<0:3> to the local switch disposed under the memory block 210 to be different from each other, various bit lines may be selected by the same local selection signal LY<0:n>. Further, the numbers of the local selection signal LY<0:n> and the numbers of the signal lines for transferring the local selection signal LY<0:n>may be reduced.

Data transmission path of the resistive memory apparatus 2 when the first local selection signal LY<0> and the first global selection signal GY<0> are enabled will be described with reference to FIGS. 4 and 5. When the first local selection signal LY<0> and the first global selection signal GY<0> are enabled, the first bit line BL0 may be electrically coupled to the seventh local bit line LBL6 and the seventh global bit line GBL6. Therefore, during the write operation, data transmitted to the seventh local bit line LBL6 and the seventh global bit line GBL6 by the write circuit 221 may be stored in a memory cell electrically coupled to the first bit line BL1. Also, during the read operation, data outputted from a memory cell electrically coupled to the first bit line BL1 may be outputted to the read circuit 22 through the seventh local bit line LBL6 and the seventh global bit line GBL6. In addition, the read circuit 222 may sense the data transmitted through the seventh global bit line GBL6. Further, the read circuit 222 may output the sensed data to an external of the resistive memory apparatus 2. Further, when the first local selection signal LY<0> and the first global selection signal GY<0> are enabled, the ninth bit line BL8 may be electrically coupled to the fifth local bit line LBL4 and the fifth global bit line GBL4. The sixth bit line BL5 may be electrically coupled to the eighth local bit line LBL7 and the eighth global bit line GBL7. In addition, the fourteenth bit line BL13 may be electrically coupled to the sixth local bit line LBL5 and the sixth global bit line GBL5.

Figure 6:
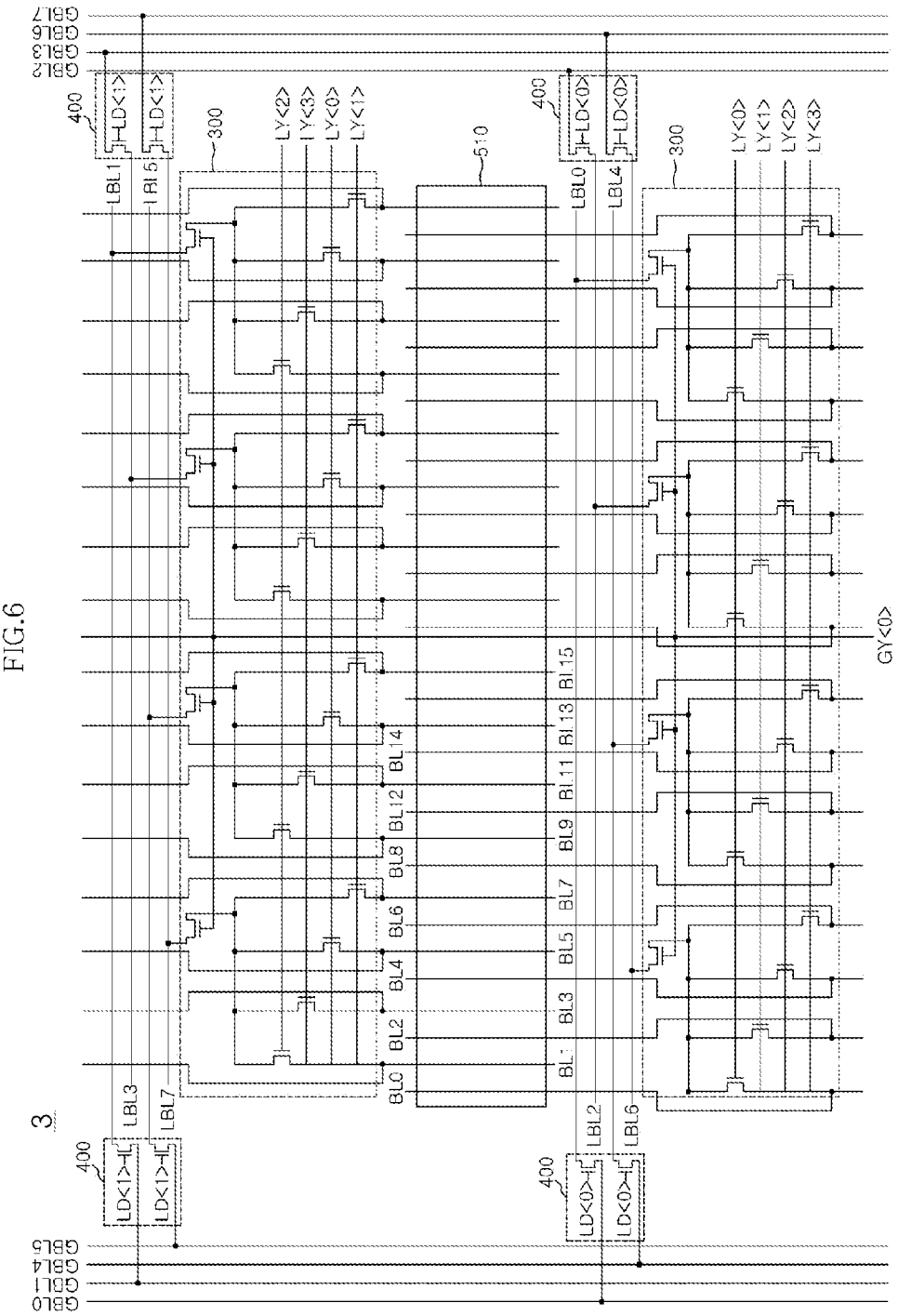
FIG. 6 is a schematic diagram illustrating a representation is of a resistive memory apparatus in accordance with an embodiment.

Referring to FIG. 6, a schematic diagram illustrating a resistive memory apparatus 3 in accordance with an embodiment of the invention is shown. The resistive memory apparatus 3 may include a loading control portion 400 as well as all of the elements included in the resistive memory apparatus 2 described with reference to FIG. 5. The loading control portion 400 may control electrical coupling between the plurality of local bit lines LBL0 to LBL7 and the plurality of global bit lines GBL0 to GBL7 in response to a loading control signal LD<0:1>. The resistive memory apparatus 3 may include a memory block 510, a plurality of bit lines BL0 to BL15, a plurality of local bit lines LBL0 to LBL7, a plurality of global bit lines GBL0 to GBL7. In addition, the resistive memory apparatus 3 may include a decoding switching part 600 to electrically couple each of the plurality of bit lines BL0 to BL15 to the plurality of local bit lines LBL0 to LBL7 and the plurality of global bit lines GBL0 to GBL7 in response to a local selection signal LY<0:3> and a global selection signal GY<0>.

The loading control portion 400 may control electrical coupling between the plurality of local bit lines LBL0 to LBL7 and the plurality of global bit lines GBL0 to GBL7 according to the loading control signal LD<0:1>. FIG. 5 illustrates the plurality of local bit lines LBL0 to LBL7 directly coupled to the plurality of global bit lines GBL0 to GBL7 without switch. In this instance, load may become too great for the write circuit 221 and the read circuit 222, which are electrically coupled to the plurality of global bit lines GBL0 to GBL7. Therefore, the loading control portion 400 may effectively reduce the load for the data input/output circuit 220 by electrically coupling the plurality of local bit lines LBL0 to LBL7 to the plurality of global bit lines GBL0 to GBL7 involved in substantial data transfer according to the loading control signal LD<0:1>. Similarly to the global selection signal GY<0>, the loading control signal LD<0:1>may be generated on the basis of the row address signal.

Figure 7:
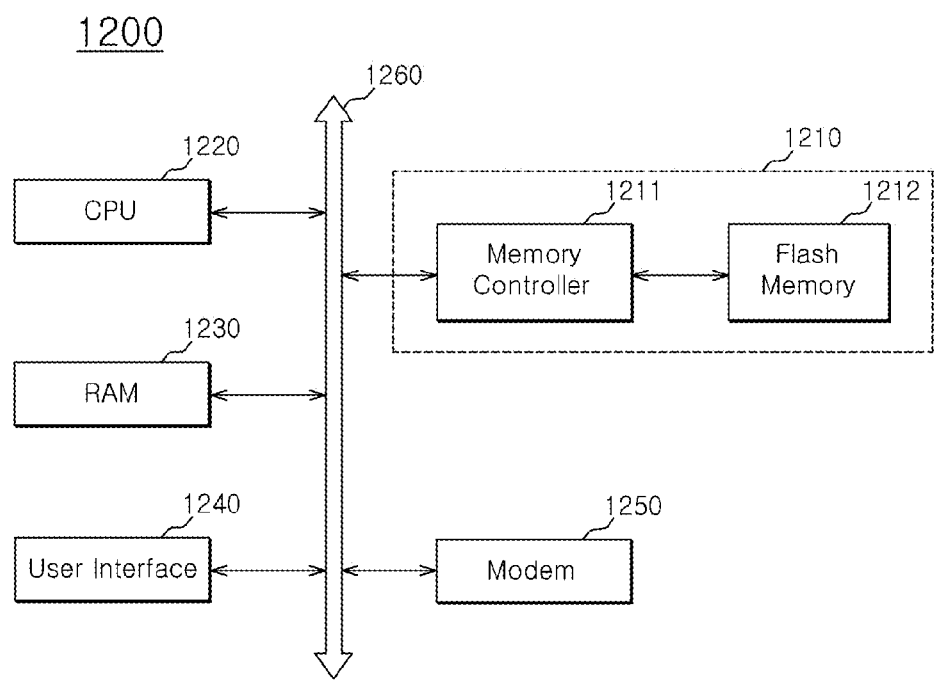
FIG. 7 is a schematic block diagram of a computing system including a flash memory device according to an embodiment of the invention.

Referring to FIG. 7, a computing system 1200 may include a microprocessor 1200, RAM 1230, a user interface 1240, a modem 1250, such as a baseband chipset, and a memory system 1211 that are electrically coupled to a system bus 1260. The memory system 1211 may include the resistive memory apparatus 1 described above. If the computing system 1200 is a mobile device, a battery may be additionally provided to applying an operating voltage to the computing system 1200. The memory system 1211 may include a flash memory device 1212, and may use a non-volatile memory to store data.

While certain embodiments have been described above, it will be understood to those skilled in the art that the embodiments described are by way of example only. Accordingly, the stacked semiconductor apparatus and the semiconductor system capable of inputting signals through various paths should not be limited based on the described embodiments. Rather, the stacked semiconductor apparatus and the semiconductor system capable of inputting signals through various paths described should only be limited in light of the claims that follow when taken in conjunction with the above description and accompanying figures.

What is claimed is:

1. A resistive memory apparatus comprising:
    a memory block including a plurality of memory cells;
    a plurality of bit lines electrically coupled to the plurality of memory cells, and extended in a column direction;
    a plurality of local bit lines extended in a row direction;
    a decoding switching part suitable for electrically coupling one or more of the plurality of bit lines to the plurality of local bit lines according to both of a local selection signal and a global selection signal; and
    a plurality of global bit lines extended in the column direction, and electrically coupled to the plurality of local bit lines.

2. The resistive memory apparatus of claim 1, the decoding switching part comprises:
    a local selection portion suitable for selecting the one or more of the plurality of bit lines according to the local selection signal; and a global selection portion suitable for electrically coupling output of the local selection portion to the plurality of local bit lines according to the global selection signal.

3. The resistive memory apparatus of claim 1,
    wherein the plurality of bit lines are disposed on the memory block, and
    wherein the plurality of local bit lines are disposed over and under the memory block in the column direction.

4. The resistive memory apparatus of claim 1, further comprising:
    a data input/output circuit electrically coupled to the plurality of global bit lines, and suitable for transmitting data to the plurality of global bit lines, or receiving data transmitted through the plurality of global bit lines.

5. The resistive memory apparatus of claim 1,
    wherein the memory block includes a memory array and a repair array, and
    wherein one of the plurality of bit lines electrically coupled to a memory cell of the memory array, and one of the plurality of bit lines electrically coupled to a memory cell of the repair array are electrically coupled to the plurality of local bit lines in common through the decoding switching part.

6. The resistive memory apparatus of claim 3, further comprising:
    a loading control portion suitable for controlling electrical coupling between the plurality of local bit lines and the plurality of global bit lines according to a loading control signal.

7. A resistive memory apparatus comprising:
    a plurality of bit lines coupled to one or more of memory cells and configured to comprise a plurality of even bit lines and a plurality of odd bit lines;
    a first decoding switching part configured to couple the plurality of the even bit lines to a plurality of even local bit lines in response to a local selection signal and a global selection signal;
    a second decoding switching part configured to couple the plurality of the odd bit lines to a plurality of odd local bit lines in response to the local selection signal and the global selection signal; and
    a plurality of global bit lines coupled to the plurality of even local bit lines and the plurality of odd local bit lines.

8. The resistive memory apparatus of claim 7, wherein the first decoding switching part and the plurality of even local bit lines are disposed under a memory block.

9. The resistive memory apparatus of claim 8, wherein the first decoding switching part is configured to couple a plurality of even bit lines of another memory block disposed under the memory block to the plurality of the even local bit lines.

10. The resistive memory apparatus of claim 7, wherein the second decoding switching part and the plurality of odd local bit lines are disposed over a memory block.

11. The resistive memory apparatus of claim 10, wherein the second decoding switching part is configured to couple a plurality of odd bit lines of another memory block disposed over the memory block to the plurality of odd local bit lines.

12. The resistive memory apparatus of claim 7, the first decoding switching part comprises:
    a first local selection portion configured to select the one or more of the plurality of even bit lines according to the local selection signal; and
    a first global selection portion configured to couple output of the first local selection portion to the plurality of even local bit lines according to the global selection signal.

13. The resistive memory apparatus of claim 12, the second decoding switching part comprises:
    a second local selection portion configured to select the one or more of the plurality of odd bit lines according to the local selection signal; and
    a second global selection portion configured to couple output of the first local selection portion to the plurality of odd local bit lines according to the global selection signal.

14. The resistive memory apparatus of claim 13, wherein an input sequence of the local selection signal to the first local selection portion is different from an input sequence of the local selection signal to the second local selection portion.

* * * * *